United States Patent
Okuyama

(10) Patent No.: US 7,298,506 B2
(45) Date of Patent: Nov. 20, 2007

(54) IMAGE FORMING APPARATUS AND IMAGE FORMING METHOD FOR PREVENTING COUNTERFEITING

(75) Inventor: Hiroyuki Okuyama, Mishima (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 930 days.

(21) Appl. No.: 10/391,803

(22) Filed: Mar. 20, 2003

(65) Prior Publication Data

US 2004/0032612 A1 Feb. 19, 2004

(30) Foreign Application Priority Data

Apr. 2, 2002 (JP) ............... 2002-100488

(51) Int. Cl.
 G06F 15/00 (2006.01)
 G06K 1/00 (2006.01)
 G06K 9/00 (2006.01)

(52) U.S. Cl. ............ 358/1.14; 358/1.16; 382/135

(58) Field of Classification Search .......... 358/1.1, 358/1.9, 1.11–1.18; 382/135, 191, 227
See application file for complete search history.

(56) References Cited

U.S. PATENT DOCUMENTS 5,621,810 A * 4/1997 Suzuki et al. ............ 382/135
5,781,653 A * 7/1998 Okubo ..................... 382/135
2005/0213138 A1* 9/2005 Ohta ....................... 358/1.14

FOREIGN PATENT DOCUMENTS

| JP | 05-083548   | 4/1993  |
| JP | 5-336354 A  | 12/1993 |
| JP | 11-261799   | 9/1999  |
| JP | 2000-196872 | 7/2000  |
| JP | 2001-61057 A | 3/2001 |
| JP | 2001-328315 A | 11/2001 |

* cited by examiner

Primary Examiner—Gabriel Garcia
(74) Attorney, Agent, or Firm—Foley & Lardner LLP

(57) ABSTRACT

An image forming apparatus has a collating section which collates image information from a scanner with a specific image and determines whether or not there is a same portion, and a line delay section which outputs the image information after delaying the image information in accordance with time spent on collation processing. Because a dedicated memory is unnecessary due to timing between processing of the collation processing section and other processings being coordinated at the line delay section, a large reduction in costs can be realized.

2 Claims, 4 Drawing Sheets

IMAGE FORMING APPARATUS AND IMAGE FORMING METHOD FOR PREVENTING COUNTERFEITING

BACKGROUND OF THE INVENTION

The present invention relates to an image forming apparatus, and in particular, to an image forming apparatus which carries out collation processing with image information to be copied, and a specific image in order to prevent counterfeiting, and to a method thereof.

Recently, the performance of image forming apparatuses such as a digital coping machines or the like has been improved, and carrying out countermeasures with respect to preventing counterfeiting of paper moneys, securities, or the like has been required. Namely, in an MFP product having a scanner function, it is possible to prepare fraudulent image information of paper moneys, securities, or the like by the scanner function or the like. Therefore, in a copying function, a countermeasure has been carried out in which a function, which is such that the MFP product which is the copy source can be specified by a countermeasure such as adding a tracking pattern to the fraudulent image information or the like, is provided. However, in the scanner function, even if the aforementioned countermeasure is executed, there is the possibility that the image information will be processed after reading the image information. Therefore, at the time of fetching by scanning, processing such as replacing an image which is inappropriate for output with another image, or the like is necessary.

Then, at the time of scanning, with respect to a region determined to be fraudulent image information, due to the fraudulent image information being replaced with a mask signal such as a black signal or a white signal which is prepared in advance, the fraudulent image information is prevented from being copied.

However, in a conventional apparatus, in collation processing with paper moneys, securities, or the like, real-time processing is difficult, and much processing time is required. Therefore, after image information is once stored in a memory, it is necessary to again read the image information for which collation processing has been completed. Therefore, there are the problems that a dedicated memory is required, and the costs increases, and further, time for writing and reading image information is needed.

BRIEF SUMMARY OF THE INVENTION

An object of the present invention is to provide an image forming apparatus which does not need a memory dedicated for collation processing, and which can reduce costs, by using a delay circuit having a delay time corresponding to collation processing with a specific image for preventing counterfeiting, and a method thereof.

In order to achieve the above object, according to an aspect of the present invention, there is provided an image forming apparatus comprising: a collating section which collates provided image information with a specific image, and determines whether or not there is a same portion; a delay section which receives the image information, and outputs the image information at least after delaying the image information in accordance with time spent on collation processing by the collating section; an eliminating section which, when the collating section determines that the same portion as in the specific image is included in the image information, substantially eliminates at least the same portion from the image information outputted from the delay section and outputs it; and an image forming section which carries out image formation on a recording medium in accordance with at least one of the image information supplied from the delay section and the image information in which the same portion has been eliminated by the eliminating section.

As described above, in the present invention, in a case of carrying out counterfeiting prevention by collating the image information read by a scanner with a specific image intended to prevent counterfeiting of paper moneys, securities, or the like in a color copying machine, a delay circuit corresponding to the processing time of the collation processing is provided in order to achieve a reduction in costs by omitting a dedicated memory device for the collation processing needing comparatively much time. In accordance therewith, because there is no need to prepare a memory device in which image information read by a scanner is stored in the memory until the collation processing is completed in the conventional apparatus, it is possible to achieve a large reduction in costs by making the structure be compact.

Note that, in the delay circuit at this time, focusing on the fact that, for example, line delay processing formed from a memory is originally built-in in a color MFP product whose printing system is a tandem engine in order to adjust the output timing for each color plate, the memory for the line delay processing can be used in common. In accordance therewith, a dedicated memory circuit for image information is not necessary in order to ensure delay of the processing time in the collation processing at the time of scanning, and a large cost reduction effect can be obtained.

DETAILED DESCRIPTION OF THE INVENTION

Hereinafter, an image forming apparatus which is an embodiment of the present invention will be described in detail with reference to the drawings.

The present invention provides an image forming apparatus which can reduce costs due to a dedicated memory for collation processing being unnecessary, by using a delay circuit having a delay time corresponding to collation processing with a specific image in order to prevent counterfeiting, and provides a method thereof. First, as one example of the image forming apparatus to which the present invention is applied, in particular, an MFP having a tandem type printer engine will be described with reference to the drawings.

<One Example of the Image Forming Apparatus to which the Present Invention is Applied>

Figure 4:
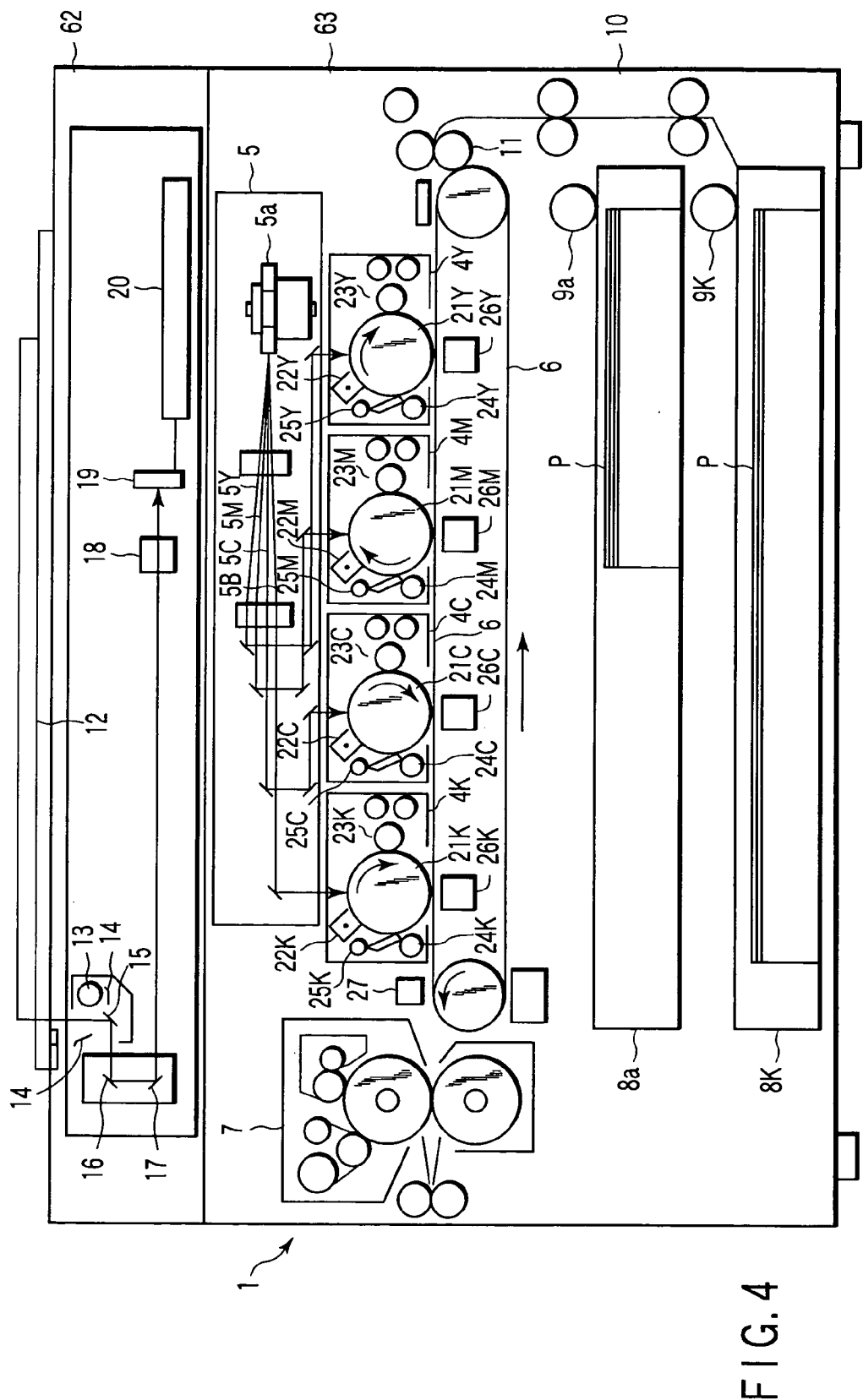
FIG. 4 is a sectional view showing one embodiment of a structure of the image forming apparatus according to the present invention.

An internal structure of a color digital copying apparatus having a tandem type printer engine is shown in FIG. 4. In FIG. 4, a scanner 62 has an illumination lamp 13, a reflector 14, reflecting mirrors 15 through 17, a focusing lens 18, a light-receiving element 19, and an image processing device 20. The illumination lamp 13 is for illuminating a document (not shown) placed on a document placement stand 12. The reflector 14 is for converging light from the illumination lamp 13 toward the document. The optical system is for guiding the light reflected from the document to the light-receiving element 19 by using the reflecting mirrors 15 through 17, the focusing lens 18, and the like. The light-receiving element 19 is a CCD or the like, and is for converting the light from the document into an electronic signal.

The image processing section 20 includes a delay processing section 104 which calculates a line delay time which considers a delay time of a collation processing section 101 for preventing counterfeiting or a delay time for each line, and which carries out the required delay, as will be described later. Moreover, by using respective color signal laser drivers 131 through 134 which will be described later, the image processing section 20 prepares image signals of the respective colors of yellow (Y), magenta (M), cyan (C), black (B), in which an electric signal photoelectrically transformed by a scanner 62 is color-separated.

An image forming unit 63 has four image forming sections 4Y, 4M, 4C, and 4B, an exposing section 5, a transfer belt 6, and a fixing section 7.

The four image forming sections 4Y, 4M, 4C, and 4B form images of a total of four colors which Y, M, C which are the respective color components in subtractive primaries, and B for reinforcing contrast. The exposing section 5 is for irradiating exposure light (for example, a laser beam), whose light intensity is intermittently changed in accordance with image signals supplied from the scanner unit 62 or the exterior, onto photosensitive drums 21Y, 21M, 21C, and 21B provided at the respective image forming sections 4Y, 4M, 4C, and 4B. The transfer belt 6 is for successively laminating the images formed at the respective image forming sections 4Y, 4M, 4C, and 4B, while conveying a paper P which is a transfer material (image forming medium). The fixing section 7 is for fixing a developer image on the paper P by heating while pressuring the paper P conveyed by the transfer belt 6 and the image (developer image) on the paper P.

The respective image forming sections 4Y, 4M, 4C, and 4B respectively have substantially the same structures, and form images corresponding to the respective colors by a well-known electrophotographic process. However, the diameters of the photosensitive drums 21Y, 21M, 21C, and 21B are the same.

Further, at the peripheries of the photosensitive drums 21Y, 21M, 21C, and 21B, charging sections 22Y, 22M, 22C, and 22B, developing sections 23Y, 23M, 23C, and 23B accommodating toners which are developers of colors corresponding thereto, transfer sections 26Y, 26M, 26C, and 26B, cleaning sections 24Y, 24M, 24C, and 24B, and discharging section 25Y, 25M, 25C, and 25B are respectively disposed along the rotation directions of the photosensitive drums.

In accordance with the structure, color images corresponding to laser beams 5Y, 5M, 5C, and 5B which are emitted from the exposure section 5 in accordance with the image signals color-separated for each color and which are scanned by a polygon mirror 5a, are formed.

The transfer devices 26Y, 26M, 26C, and 26B are provided at positions and facing beneath the photosensitive drums 21Y, 21M, 21C, and 21B, with the transfer belt 6 being provided therebetween.

Paper cassettes 8a, 8b for holding papers P on which the toner images formed at the respective image forming sections 4Y, 4M, 4C, and 4B are transferred, are provided at predetermined positions below the transfer belt 6. Pickup rollers 9a, 9b for fetching the papers P accommodated in the cassettes one-by-one are provided at the respective paper cassettes 8a, 8b. Further, a paper conveying section 10 formed from guides and rollers for feeding a paper P fetched by the pickup rollers 9a, 9b toward the transfer belt 6 is formed between the respective paper cassettes 8a, 8b and the transfer belt 6.

Moreover, aligning rollers 11 setting a timing of sending out the paper P toward the transfer belt 6 are provided at predetermined positions at the transfer belt 6 side of the paper conveying section 10, in order to coordinate the paper P, which is fetched from one of the cassettes and is being conveyed through the paper conveying section 10, and the positions of the images formed at the respective image forming sections 4Y, 4M, 4C, and 4B.

In the color image forming apparatus 1, when an image signal is supplied from the scanner 62 or the exterior, in accordance with a time series, the photosensitive drums 21Y, 21M, 21C, and 21B of the respective image forming sections 4Y, 4M, 4C, and 4B are charged to predetermined electric potentials by a charging power-supply unit (not shown). Further, a laser beam, whose light-intensity is intermittently changed on the basis of the image signal, is irradiated on the individual photosensitive drums 21Y, 21M, 21C, and 21B from the exposure section 5.

In accordance therewith, electrostatic latent images corresponding to the color images which are to be outputted are formed on the photosensitive drums 21Y, 21M, 21C, and 21B of the four image forming sections 4Y, 4M, 4C, and 4B. The timings of exposing the images on the photosensitive drums 21Y, 21M, 21C, and 21B of the respective image forming sections 4Y, 4M, 4C, and 4B are defined in a predetermined order in accordance with the movement of the paper P conveyed on the transfer belt 6.

The electrostatic latent images formed on the photosensitive drums 21Y, 21M, 21C, and 21B of the respective image forming sections 4Y, 4M, 4C, and 4B are disposed in the same image forming sections 4Y, 4M, 4C, and 4B. The electrostatic latent images are developed due to the toners selectively being provided by the developing sections 23Y, 23M, 23C, and 23B accommodating the color toners (developers) of the colors which have been determined in advance, and are successively transferred onto the paper 6 on the transfer belt 6 by the transfer devices facing the photosensitive drums 21Y, 21M, 21C, and 21B with the transfer belt 6 being interposed therebetween.

Note that the paper P is fetched from a cassette accommodating the papers P whose size corresponds to a size selected in advance or to the size of the image exposed by the exposure section 5. The paper P is conveyed to the aligning rollers 11 of the paper conveying section 10, and is temporarily stopped at the aligning rollers 11.

Further, the paper P is fed toward the transfer belt 6 from the aligning rollers 11 at the timing of exposing an image of the first color by the exposure section 5 or at a predetermined timing. At this time, the paper P is charged by a charging device (for the paper P) provided in the vicinity of the roller at the paper feeding section side supporting the transfer belt 6, and is made to firmly adhere to the transfer belt 6. The paper P on which the toners formed by the respective image forming sections 4Y, 4M, 4C, and 4B, i.e., the toner images, are transferred is conveyed to the fixing section 7. Further, the melted toner is fixed on the paper P at the fixing section 7.

Next, one example of a motor control section 30 rotation-controlling the four photosensitive drums 21Y, 21M, 21C, and 21B which are tandem types will be described with reference to FIG. 5.

Figure 5:
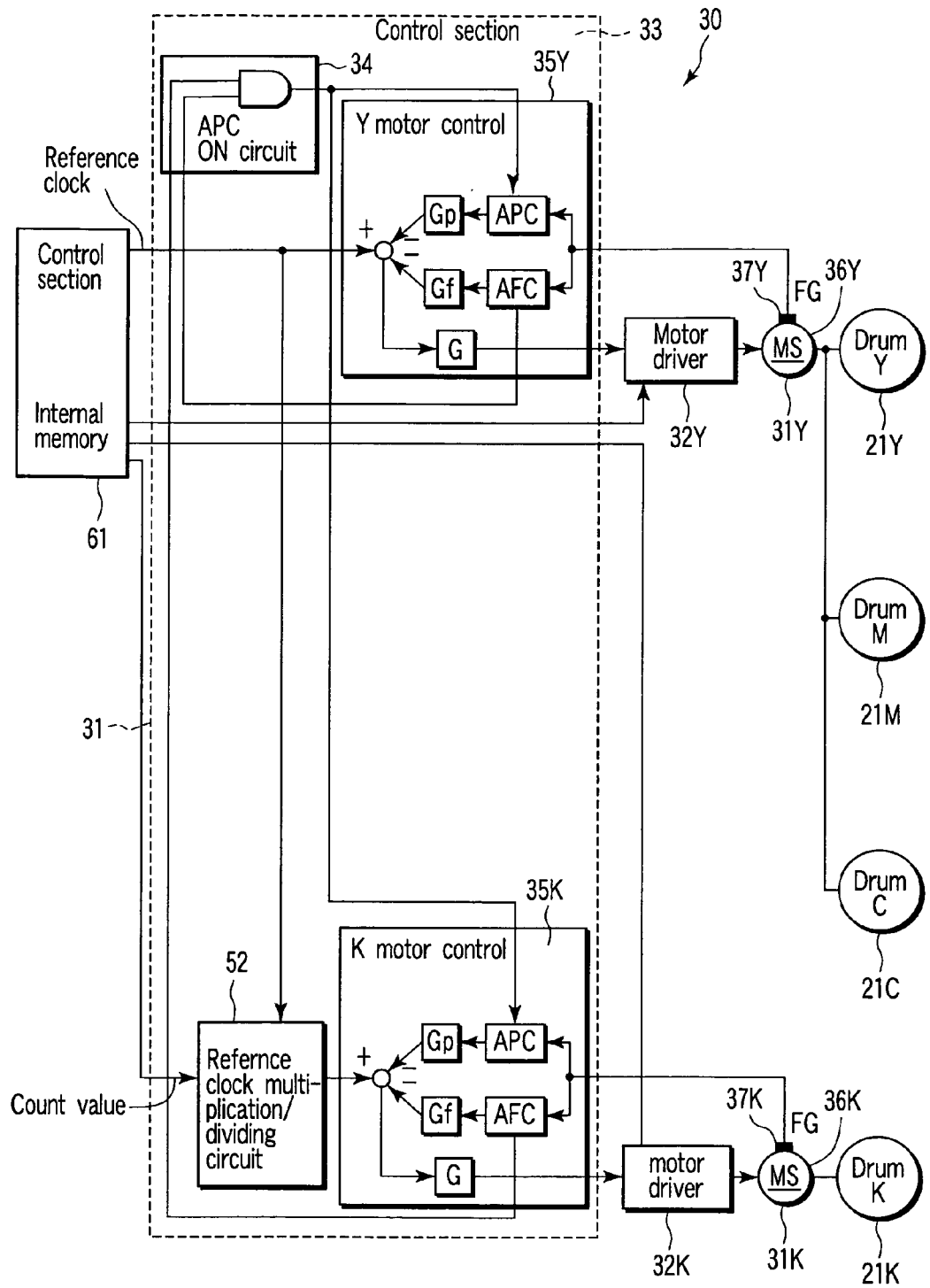
FIG. 5 is a block diagram showing one embodiment of the image forming apparatus according to the present invention.

As shown in FIG. 5, the motor control section 30 is connected to a control section 61 controlling the entire apparatus, and as one example, is formed from a DC motor 31Y rotating the photosensitive drums 21Y, 21M, and 21C, a DC motor 31B rotating the photosensitive drum 21B, motor drivers 32Y, 32B driving the DC motors 31Y and 31B, and a control circuit 33.

The control circuit 33 is formed from a control ASIC. More specifically, the control circuit 33 is formed from an APC ON circuit 34, motor control circuits 35Y, 35B, and a reference clock multiplication/dividing circuit 52. The photosensitive drums 21Y, 21M, 21C, and 21B are respectively connected to the DC motors 31Y, 31B for rotational driving via a connecting transmission section (not shown) or the like. These DC motors 31Y, 31B are respectively driven by the individual motor control circuits 35Y, 35B.

<Collation Processing and Delay Processing which are the Features of the Present Invention>

Figure 1:
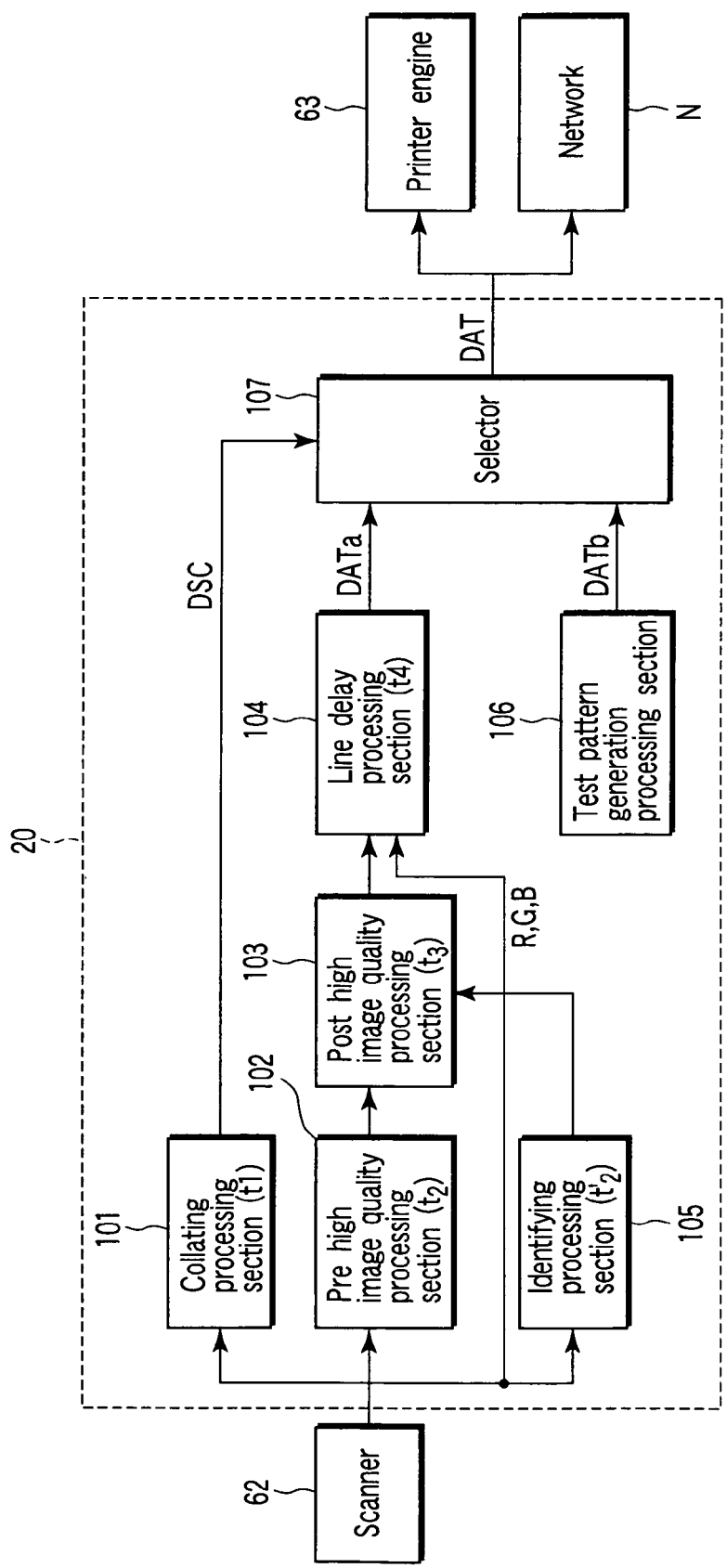
FIG. 1 is a block diagram showing an image forming apparatus which is the feature portion of an image forming apparatus according to the present invention.

In the image forming apparatus having the structure described above, an example of the structure realizing collation processing and the delay processing thereof which are the features of the present invention is shown, centering on the image processing apparatus 20. FIG. 1 is a block diagram showing an image processing apparatus which is the feature portion of the image forming apparatus according to the present invention. In FIG. 1, the image processing apparatus 20 has a pre high image quality processing section 102 which receives an image signal read by the scanner 62 and which carries out high image quality processing, a collation processing section 101 carrying out collation with an image such as, for example, paper money, securities, or the like which is the object of counterfeiting prevention from the image signal, and an identifying processing section 105 for detecting a region identifying signal of image information. Moreover, the image processing apparatus 20 has a post high image quality processing section 103 receiving output of the pre high image quality processing section 102 and output of the identifying processing section 105. A selector 107 receiving a collation signal DSC, which is the collated result from the collation processing section 101, is provided in the image processing apparatus 20.

Moreover, the image processing apparatus 20 has a line delay processing section 104 which receives a high image quality signal of the post high image quality processing section 103, and which considers a delay time for each color signal at the time of carrying out image formation for each of the four photosensitive drums 21Y, 21M, 21C, and 21B described above and are tandem types, and considers a delay time at the collation processing section 101. The image processing apparatus 20 has the selector section 107 which receives image information DATa from the line delay processing section 104 and image information DATb from a test pattern generation processing section 106 generating a pattern superposed on image information for preventing counterfeiting, and which outputs a synthesized image DAT in accordance with the collation signal DSC. The output DAT of the selector section 107 is outputted to the printer engine 63, and is formed as an image. However, the output DAT of the selector section 107 may be outputted to the exterior via a network N.

Figure 2:
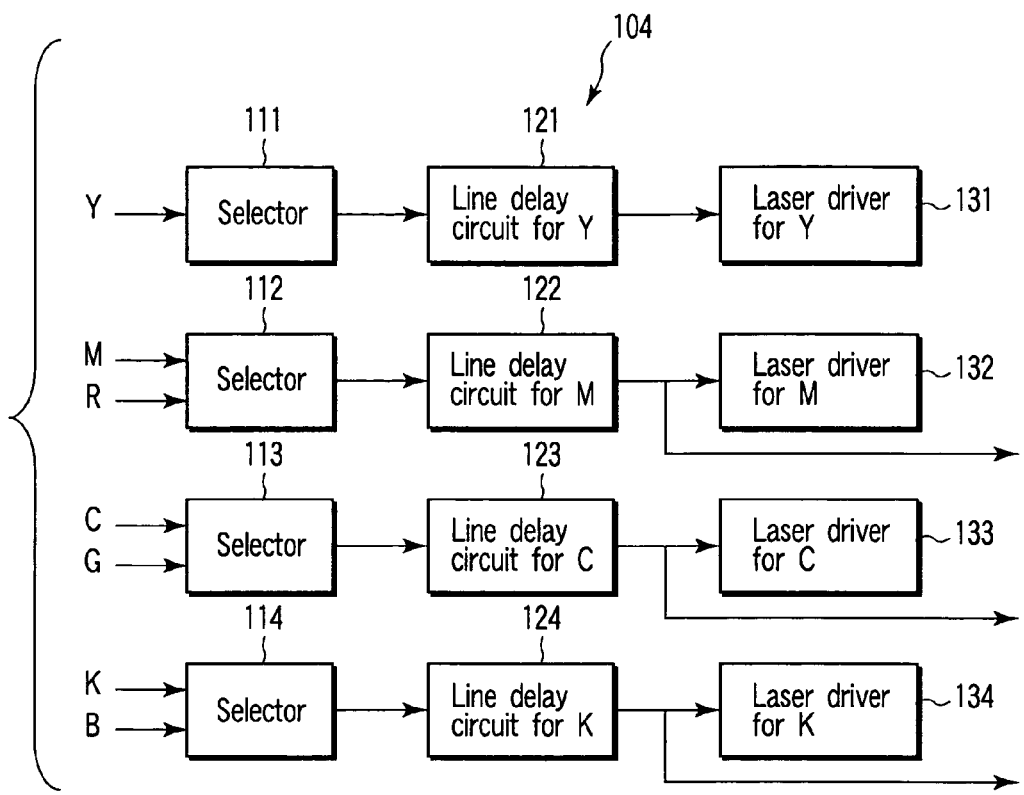
FIG. 2 is a detailed block diagram of a line delay processing section which is the feature portion of the image forming apparatus according to the present invention.

In addition, in the line delay processing section 104, as shown in FIG. 2 which is a detailed block diagram of the line delay processing section, selectors 111 through 114, to which scanner input signals R, G, B and image signals separated for each color signal of Y, M, C, K are supplied, are provided. Further, in the MFP having a tandem type engine, line delay circuits 121 through 124 of the four colors of printing inks which are necessary for adjusting the printing timing are provided (at this time, there is a case in which the Y line delay time itself is 0). This delay time is time of delay aiming for adjusting the timing with the delay time for the collation processing. Moreover, a Y laser driver 131, an M laser driver 132, a C laser driver 133, and a K laser driver 134, to which the delayed respective color image signals are inputted, are provided.

In accordance with the image processing apparatus 20 having such a structure as shown in FIG. 1 and FIG. 2, image processing accompanying appropriate delay processing as follows is carried out.

Namely, the image information provided from the scanner 62 is supplied to the collation processing section 101, the pre high image quality processing section 102, and the identifying processing section 105. The pre high image quality processing section 102 reads a specific image such as a paper money, a security, or the like which is stored in a storing region included in the collation processing section 101, and collates the specific image with the image information read by the scanner 62, in order to determine whether or not the image information read by the scanner 62 is not an image to be an object of counterfeiting prevention such as paper moneys/ securities. The result of this collation processing is supplied as the collation signal DSC to the selector 107 at the latter stage.

At this time, what should be noted that, because the collation processing at this time is collation processing in which a plurality of color images are compared with one another, a processing time $t_1$ becomes a extremely long time such as, as one example, 0.1 to 0.8 seconds. On the other hand, a processing time $t_2$ of the pre high image quality processing section 102, a processing time $t_3$ of the post high image quality processing section 102, and a processing time $t_2'$ of the identifying processing section are respectively less than or equal to 1 msec which is extremely short. There is a great disparity of 100 times or more in the difference between the both.

It is necessary to adjust the timings between the long collation processing time $t_1$ and the other extremely short times $t_2$, $t_2'$, $t_3$ (less than or equal to 1 msec) of the high image quality processings and the identifying processing. In a conventional apparatus, a dedicated memory for temporarily storing image information is provided, and this has led to the problems of high costs and increased complexity of operations.

In the present invention, as one example, it is supposed that the delay times of the delay circuits 121 through 124 for each line of the line delay processing section 104 are a delay time $t_4$ which aims to coordinate timing with the processing time $t_1$ of the collation processing section 101 (it must not be $t_1=t_2$). In accordance therewith, without a new delay circuit being provided, and due to the apparatus being structured such that a memory for delaying collation processing is unnecessary, the most efficient reduction in costs can be realized.

Moreover, in this way, when the collation processing section 101 determines that image information, which is to be an object of counterfeiting prevention, is included in the image information DATa in which processing timings are coordinated, the determination is informed to the selector 107 by the collation signal DSC.

Figure 3:
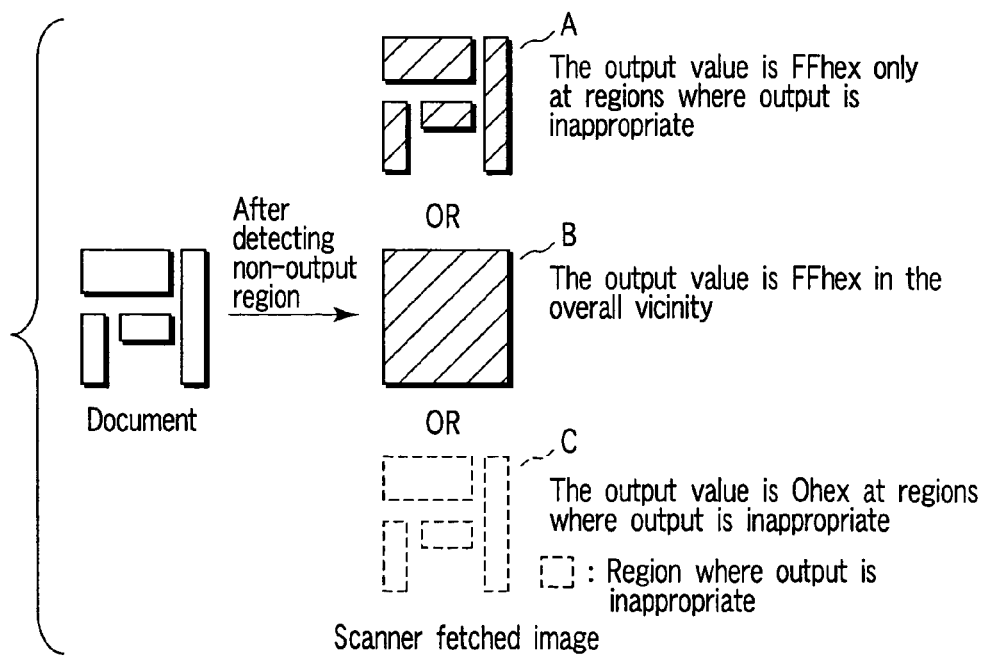
FIG. 3 is a explanatory diagram showing one example of processings of a test pattern generation processing section of the image forming apparatus according to the present invention.

Here, the test pattern generation processing section 106 is a circuit generating a test pattern for eliminating such an image to be an object of counterfeiting prevention. Further, for example, this elimination of the image is carried out by a method shown in FIG. 3 by synthesizing processing of the selector 107 in accordance with the collation signal DSC by using the pattern of the test pattern generating section 106. In FIG. 3, when a non-output region of a document is detected, a method A and a method B are painting-out methods. In the method A, due to the pattern generated in the test pattern generation processing section 106 being synthesized with an inappropriate non-output region, the output value only at the inappropriate region is FFhex. In the method B, the output values at all vicinities of the inappropriate non-output region are FFhex. A method C is voiding processing, and the output value only at the inappropriate non-output region is Ohex. Pattern data as shown in this example can be outputted by setting in advance at the test pattern generation section 106 shown in FIG. 1.

As described above in detail with reference to the drawings, by carrying out delay processing in accordance with the collation processing for preventing counterfeiting, a dedicated memory which had been conventionally needed becomes unnecessary, and a large reduction in costs is possible. Further, in particular, in an MFP structured from a tandem engine, at the time of using a scanner function, a delay circuit needed as a function for preventing counterfeiting can be used in common. Therefore, an image forming apparatus which can largely reduce the costs and a method thereof can be provided, as compared with an MFP conventionally needing a dedicated memory as a component of a counterfeiting preventing circuit.

In accordance with the various embodiments described above, those skilled in the art can realize the present invention. However, it is easy for those skilled in the art to further conceive of various modified examples of these embodiments, and the present invention can be applied to various embodiments without inventive ability. Accordingly, the present invention extends over a broad range which does not contradict the disclosed principles and the novel features, and is not limited to the embodiments described above.

As described above in detail, in accordance with the present invention, by using the delay circuit having a delay time corresponding to collation processing with a specific image in order to prevent counterfeiting, an image forming apparatus which does not need a dedicated memory for collation processing and which can reduce costs, and a method thereof can be provided.

What is claimed is:

1. A color image forming apparatus comprising:
a reading section which reads an image on a paper by a scanner, and outputs a plurality of coloring matter information signals;
a collating section which collates the plurality of coloring matter information signals from the reading section with a specific image including paper money and securities, and determines whether or not there is a same portion in order to prevent counterfeiting;
a delay section, without a memorizing function, that receives said plurality of coloring matter information signals, and has delay times which are different for each of said plurality of coloring matter information signals in consideration of time spent on collation processing by the collating section respectively;
an eliminating section which, when the collating section determines that the same portion as in the specific image is included in the image information, substantially eliminates at least the same portion from the image information outputted from the delay section and outputs it; and
an image forming section has a plurality of independent image forming structures which carries out image formation on a recording medium in accordance with the plurality of coloring matter information signals.

2. A color image forming method, comprising:
reading an image on a paper by a scanner, and outputting a plurality of coloring matter information signals;
collating the plurality of coloring matter information signals from the reading section with a specific image including paper money and securities, and determining whether or not there is a same portion in order to prevent counterfeiting;
receiving said plurality of coloring matter information signals at a delay section, without a memorizing function, that has delay times which are different for each of said plurality of coloring matter information signals in consideration of time spent on collation processing by the collating section respectively;
substantially eliminating at least the same portion from the image information outputted from the delay section when the collating section determines that the same portion as in the specific image is included in the image information and outputting it; and
forming an image on a recording medium with an image forming section that has a plurality of independent image forming structures in accordance with the plurality of coloring matter information signals.

* * * * *